Aug. 23, 1932.          W. D. FERRIS          1,873,566
BALL BEARING HINGE
Filed Nov. 17, 1930
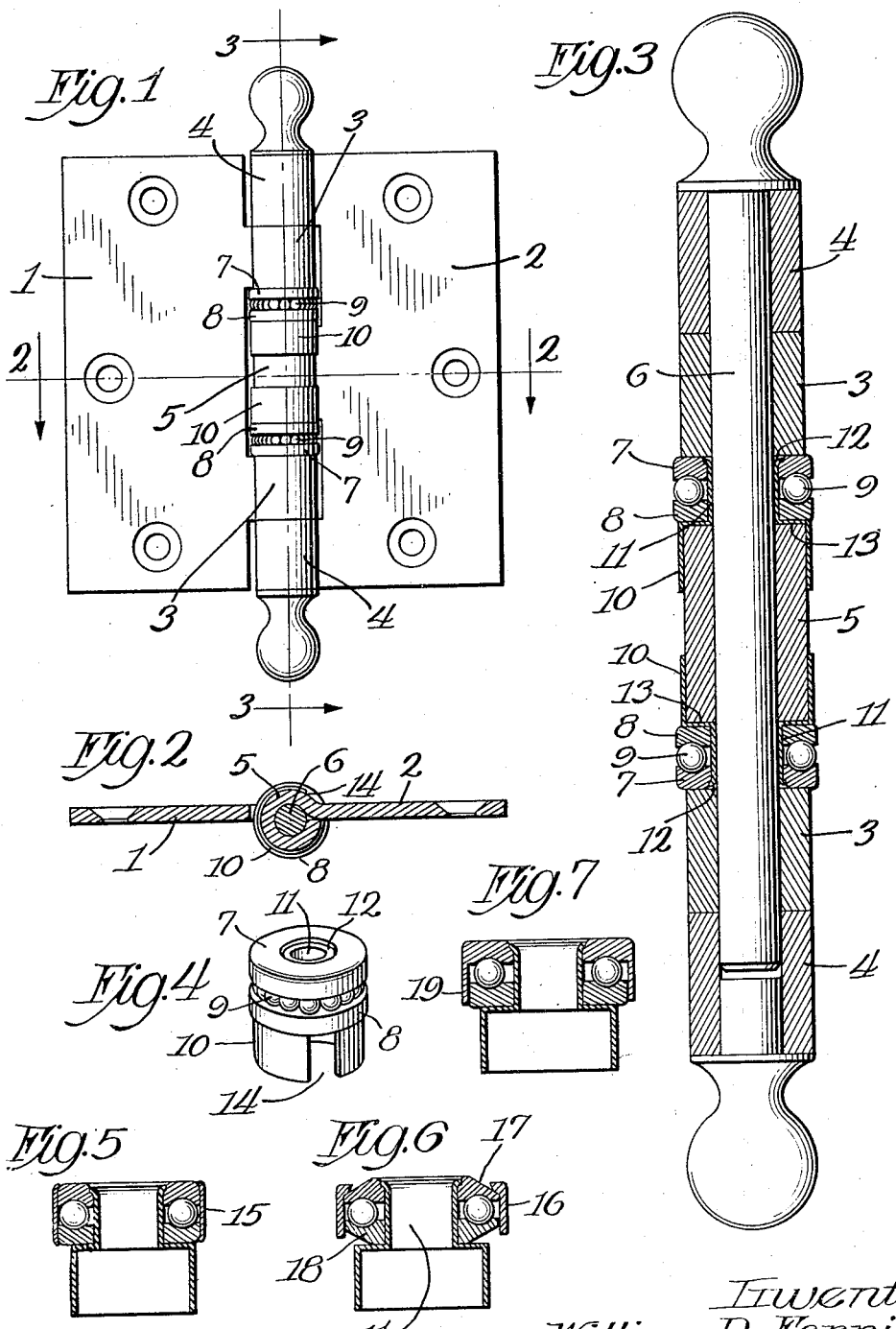

Patented Aug. 23, 1932

1,873,566

UNITED STATES PATENT OFFICE

WILLIAM D. FERRIS, OF STERLING, ILLINOIS, ASSIGNOR TO FRANTZ MANUFACTURING CO., OF STERLING, ILLINOIS, A CORPORATION OF ILLINOIS

BALL BEARING HINGE

Application filed November 17, 1930. Serial No. 496,077.

This invention relates to ball bearing hinges for doors or windows, or other closures that are mounted on hinges, and is an improvement on the construction shown in prior application Serial No. 411,735, filed December 5, 1929.

Generally stated, the object of the invention is to provide a novel and improved construction whereby a ball bearing unit is held in place by improved means, on one knuckle of the hinge, or by a sheet-metal member that has external engagement with the knuckle and internal engagement with the ball race unit.

Another object is to provide a construction of this kind in which the said sheet-metal member is detachable from the knuckle, being held in place by friction, so that the said member and the ball race unit thereof can be removed from the knuckle when such is necessary or desirable.

Another object is to provide a novel and improved ball-bearing hinge construction in which the anti-friction balls between the two rings or ball races are concealed and protected by a flange that is rigid with the upper ball race, but which is not attached to the lower ball race, whereby said flange does not hold the ball races together, but simply conceals and serves to protect the anti-friction balls against the entrance of dust or dirt, when the hinge is in use.

It is also an object to provide certain details and features of construction and combinations tending to increase the general efficiency and the desirability of a ball bearing hinge of this particular character.

To the foregoing and other useful ends, the invention consists in the matters hereinafter set forth and claimed, and shown in the accompanying drawing, in which:—

Fig. 1 is a side elevation or face view of a ball bearing hinge involving the principles of the invention.

Fig. 2 is a horizontal section on line 2—2 in Fig. 1.

Fig. 3 is a vertical section on line 3—3 in Fig. 1, on a larger scale.

Fig. 4 is a prespective of one of the ball race or ball bearing units and its sheet-metal attaching member.

Fig. 5 is a sectional view showing another form of the invention.

Fig. 6 is a similar view showing another form of the invention.

Fig. 7 is a similar view showing another form of the invention.

As thus illustrated, the invention comprises the two hinge leaves 1 and 2, having, respectively, the knuckles 3, 4 and 5, in the usual manner. A pintle or pin 6 is inserted through the knuckles, as shown.

The two ball bearing units, or ball race units, shown between the knuckles 3 and the middle knuckle 5, are alike, and a description of one will be sufficient. Referring, therefore, to Fig. 3, the upper ball race unit comprises the upper and lower rings or ball races 7 and 8, with the anti-friction balls 9 between them. A sheet-metal retaining member is provided, comprising the external sleeve portion 10 that slides over the knuckle 5, and the internal cylindrical portion 11 of less diameter, which portion 11 has its end edges spun or bent over at 12 to hold the two ball races together, the ball race 8 resting on the shoulder portion 13 of the said sheet-metal member. The sleeve portion 10 has an opening 14 in one side thereof, to accommodate the leaf 2 of the hinge.

In assembling the parts, the two units, like the unit shown in Fig. 4 of the drawing, are attached to the knuckle 5, by sliding the sleeves 10 over this knuckle, and the two leaves are then brought together with their knuckles in alignment, and the pintle 6 is then inserted as shown. The raceways 7 and 8 are not rigid with the sheet-metal member portions 10, 11 or 13, and the weight of the door is sustained by the ball bearings, or by one of them, depending on how the door is hung.

In Fig. 5, the construction is similar to that previously described, but in this case a thin sheet-metal housing 15 is spun around the two ball races, and loosely engages each ball race, so that the ball bearing is adapted to operate freely, but is at the same time provided with means for concealing and protecting the anti-friction balls.

In Fig. 6 the construction is similar, but in this case a cylindrical ring 16 is forced over the upper ball race 17, so that it forms a flange rigid with this ball race, but the flange loosely engages the periphery of the lower ball race 18, whereby the ball bearing is free to operate in the desired manner, but has the anti-friction balls thereof concealed and protected.

In Fig. 7 the construction is similar, but in this case the drop skirt or flange 19 is integral with the upper ball race, and extends downwardly to cover the anti-friction balls, in the manner shown. With this construction, there is no outer housing or container for the ball bearing unit, as such is not necessary, in view of the fact that the upper ball race itself is formed to cover the gap between the two ball races, and to thereby conceal and protect the anti-friction balls. Of course, before the two raceways are fastened together by the inner sheet-metal portion 11, the lower raceway 18 is easily removable from the bottom of the inverted cup-like member formed by the upper raceway and its said depending flange.

Obviously, with the construction shown and described, it is not necessary to change the bore of the knuckles. The ball bearing units are effectively held in place in the desired manner, but this does not require any alteration of the bore of the knuckles. In this way, the bore of each knuckle may be of normal size or diameter, as each knuckle bore is required only to receive the pintle or pin of the hinge, in the ordinary manner.

What I claim as my invention is:

1. In a ball bearing hinge, the combination of leaves having knuckles, a ball bearing raceway unit between the end of a knuckle on one leaf and the end of a knuckle on the other leaf, and a sheet-metal member for holding said unit in place on one knuckle, said member comprising an outer sleeve portion that slides over the said one knuckle, and said member having a cylindrical portion extending through the ball races and holding them together, together with a pintle extending through said knuckles and said inner cylindrical portion of said sheet-metal member.

2. A structure as specified in claim 1, said outer sleeve portion being provided with an opening at one side to receive the leaf of the knuckle to which the unit is thus attached.

3. A structure as specified in claim 1, said outer sleeve portion being held in place by friction and being removable by forcibly pulling it off from the end of the knuckle, with said cylindrical portion extending between the balls and said pintle, fitting the pintle but not touching the balls, whereby said member is tubular with a smaller diameter at one end and a larger diameter at the other end thereof, the smaller diameter fitting the pintle, and the larger diameter fitting the exterior of the knuckle.

4. A structure as specified in claim 1, having means for concealing and protecting the anti-friction balls of said unit, with said cylindrical portion extending between the balls and said pintle, fitting the pintle but not touching the balls, whereby said member is tubular with a smaller diameter at one end and a larger diameter at the other end thereof, the smaller diameter fitting the pintle, and the larger diameter fitting the exterior of the knuckle.

Specification signed this 13th day of November, 1930.

WILLIAM D. FERRIS.